United States Patent
Liu et al.

(10) Patent No.: US 11,222,091 B2
(45) Date of Patent: Jan. 11, 2022

(54) SYSTEMS AND METHODS FOR DEVELOPMENT OF WEB PRODUCTS

(71) Applicant: Citrix Systems, Inc., Fort Lauderdale, FL (US)

(72) Inventors: Xin Liu, Nanjing (CN); Yuran Ou, Nanjing (CN); Tianyu Xiao, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 116 days.

(21) Appl. No.: 16/462,272

(22) PCT Filed: Dec. 27, 2018

(86) PCT No.: PCT/CN2018/124417
§ 371 (c)(1),
(2) Date: May 20, 2019

(87) PCT Pub. No.: WO2020/133083
PCT Pub. Date: Jul. 2, 2020

(65) Prior Publication Data
US 2020/0394235 A1 Dec. 17, 2020

(51) Int. Cl.
*G06F 16/958* (2019.01)
*G06F 8/38* (2018.01)
*G06F 8/71* (2018.01)

(52) U.S. Cl.
CPC ............ *G06F 16/958* (2019.01); *G06F 8/38* (2013.01); *G06F 8/71* (2013.01)

(58) Field of Classification Search
CPC ............ G06F 16/958; G06F 8/38; G06F 8/71
See application file for complete search history.

(56) References Cited

U.S. PATENT DOCUMENTS 7,590,707 B2  9/2009  McCloy, III et al.
8,606,029 B1 * 12/2013  Wong .................... H04N 19/17
                                                    382/239

(Continued)

FOREIGN PATENT DOCUMENTS

CN    103716315 A    4/2014

OTHER PUBLICATIONS

Notification of Transmittal of the International Search Report and the Written Opinion of the International Searching Authority, or the Declaration mailed from the International Searching Authority dated Jul. 25, 2019 for International Application No. PCT/CN2018/124417, filed on Dec. 27, 2018, 9 pages.

*Primary Examiner* — Stephen S Hong
*Assistant Examiner* — Ahamed I Nazar
(74) *Attorney, Agent, or Firm* — BainwoodHuang (57) ABSTRACT

At least one target hash value is generated for a target version of a Web product from contents of a Web page displayed by the target version of the Web product. The target hash value is compared to at least one corresponding baseline hash value generated from a Web page displayed by a baseline version of the Web product. A difference between the target hash value and the baseline hash value indicates a difference between a user interface of the target version of the Web product and a user interface of the baseline version of the Web product. The user interface of the target version of the Web product is generated in response to the comparison between the target hash value and the baseline hash value.

20 Claims, 5 Drawing Sheets

(56) References Cited

U.S. PATENT DOCUMENTS

| | | | |
|---|---|---|---|
| 8,826,120 B1* | 9/2014 | Edmunds | G06F 8/20 |
| | | | 715/234 |
| 8,832,834 B2 | 9/2014 | Lee | |
| 9,386,037 B1* | 7/2016 | Hunt | H04L 63/20 |
| 2004/0205509 A1* | 10/2004 | Lou | G06F 40/194 |
| | | | 715/229 |
| 2008/0034073 A1 | 2/2008 | Murphy et al. | |
| 2010/0211893 A1* | 8/2010 | Fanning | G06F 8/38 |
| | | | 715/760 |
| 2011/0197121 A1* | 8/2011 | Kletter | G06F 40/166 |
| | | | 715/234 |
| 2011/0258040 A1 | 10/2011 | Gnanasambandam | |
| 2013/0055117 A1* | 2/2013 | Sahibzada | G06F 8/38 |
| | | | 715/762 |
| 2014/0215619 A1 | 7/2014 | Lee | |
| 2014/0359411 A1* | 12/2014 | Botta | G06F 40/197 |
| | | | 715/205 |
| 2015/0178476 A1* | 6/2015 | Horton | G06F 40/109 |
| | | | 726/26 |
| 2017/0006046 A1 | 1/2017 | Kuskov et al. | |
| 2017/0286544 A1* | 10/2017 | Hunt | H04L 63/0876 |
| 2018/0191764 A1* | 7/2018 | Chawla | H04L 63/12 |
| 2018/0349229 A1 | 12/2018 | Mcgrath | |
| 2019/0324890 A1* | 10/2019 | Li | G06F 8/38 |
| 2020/0019583 A1* | 1/2020 | Halfond | G06F 16/986 |
| 2021/0149974 A1* | 5/2021 | Yang | G06Q 20/3827 |

* cited by examiner

SYSTEMS AND METHODS FOR DEVELOPMENT OF WEB PRODUCTS

TECHNICAL FIELD

The present disclosure relates generally to systems and methods for development of Web products, and more specifically to improved technology for detecting differences between a user interface of a target version of the Web product and a user interface of a baseline version of the Web product.

BACKGROUND

During development of a Web product such as a Web page or Web application, it is desirable to be able to effectively and efficiently determine whether the user interface of one version of the Web product is different from the user interface of another version of the Web product. This situation arises when a new version of the Web product is generated, e.g. to add new features to the Web product, and/or to fix bugs that have been detected in a previous version of the Web product.

SUMMARY

A difference between the user interface of the new version and the user interface of a previous baseline version of the Web product may indicate that changes made to the Web product when generating the new version of the Web product have caused the user interface of the target version of the Web product to be displayed incorrectly.

Detecting differences between the user interface of a new version of a Web product and the user interface of a previous baseline version of the Web product is especially important because functional verification of the new version of the Web product may not be sufficient to check the user interface of the new version of the Web product for correctness. Functional verification of the new version of the Web product may fail to detect whether the user interface of the target version of the Web product is being displayed incorrectly.

Previous technologies for detecting differences between user interfaces have had significant shortcomings. For example, some previous technology for detecting differences between user interfaces operated by taking a screenshot of one user interface, and a screenshot of another user interface, and then displaying the two screenshots to a user. The user must then visually compare the two displayed screenshots and attempt to determine whether there are any visual differences between them. Such previous technologies are resource intensive at least in terms of requiring a large amount of user time to make the visual comparisons. Such previous technologies are also error prone, due to the difficulty of accurately and exhaustively identifying differences by visual comparison of two displayed screenshots.

Other previous technologies have attempted to detect user interface differences based solely on an automatic comparison of screenshots of the two user interfaces. However, the actual contents of screenshots may be dependent on external factors, unrelated to the operation of the underlying Web product, such as browser version and/or screen resolution. Accordingly, technologies that rely completely on automated comparison of screenshots often have a high rate of false negative determinations, which incorrectly indicate that there is a difference between the user interfaces being compared, even though the screenshot mismatch actually reflects differences between the screenshots that are caused by external factors, such as a difference in browser versions that display the Web pages.

To address the above described and other shortcomings of previous technologies, new technology is described herein for detecting user interface differences while generating a user interface of a Web product. In the technology described herein, at least one target hash value is generated for a target version of the Web product from the contents of a Web page that is displayed by the target version of the Web product. The target hash value is compared to at least one baseline hash value that is generated from a Web page displayed by a baseline version of the Web product. A difference between the target hash value and the baseline hash value indicates a difference between a user interface of the target version of the Web product and a user interface of the baseline version of the Web product.

In response to the comparison of the target hash value to the baseline hash value, the user interface of the target version of the Web product may be generated by modifying the Web page displayed by the target version of the Web product to cause the user interface of the target version of the Web product to match the user interface of the baseline version of the Web product.

In some embodiments, in response to detecting a difference between the target hash value and the baseline hash value, a target screenshot generated from the Web page displayed by the target version of the Web product may be compared to a baseline screenshot generated from the baseline version of the Web product. In response to detecting the difference between the target screenshot and the baseline screenshot, a difference notification may be generated indicating that the user interface of the target version of the Web product does not match a user interface of the baseline version of the Web product. The difference notification may include a graphical indication of the difference between the target screenshot and the baseline screenshot.

In some embodiments, generating the difference notification may include i) identifying a region of pixels within the target screenshot that is different from a corresponding region of pixels within the baseline screenshot, ii) generating a modified target screenshot at least in part based on modification of the target screenshot to visually indicate the region of pixels within the target screenshot that is different from the corresponding region of pixels within the baseline screenshot, and iii) storing the modified target screenshot into a screenshot repository that stores one or more modified target screenshots.

In some embodiments, one or more of the modified target screenshots may be displayed within a user interface. The one or more modified target screenshots displayed in the user interface may include the modified screenshot that visually indicates the region of pixels within the target screenshot that is different from the corresponding region of pixels within the baseline screenshot.

In some embodiments, baseline data may be generated from the baseline version of the Web product at least in part by i) generating at least one baseline hash value from the contents of a Web page displayed by the baseline version of the Web product, and ii) capturing a baseline screenshot by capturing a screenshot of the Web page displayed by the baseline version of the Web product.

In some embodiments, the baseline hash value may include a baseline HTML hash value that is generated by i) extracting HyperText Markup Language (HTML) from the Web page displayed by the baseline version of the Web product and ii) applying a hash function to the HyperText Markup Language (HTML) extracted from the Web page displayed by the baseline version of the Web product. The target hash value may include a target HTML hash value that is generated by i) extracting HyperText Markup Language (HTML) contained in the Web page displayed by the target version of the Web product, and ii) applying the hash function to the HyperText Markup Language (HTML) extracted from the Web page displayed by the target version of the Web product. Comparing the target hash value to the baseline hash value may include comparing the target HTML hash value to the baseline HTML hash value.

In some embodiments, the baseline hash value may also include one or more baseline style sheet hash values, each of which is generated by i) extracting a style sheet from the Web page displayed by the baseline version of the Web product, and ii) applying the hash function to the style sheet extracted from the Web page displayed by the baseline version of the Web product. The target hash value may also include one or more target style sheet hash values, each of which is generated by i) extracting a style sheet from the Web page displayed by the target version of the Web product, and ii) applying the hash function to each style sheet extracted from the Web page displayed by the target version of the Web product. Comparing the target hash value to the baseline hash value may also include comparing at least one target style sheet hash value to at least one baseline style sheet hash value. Each one of the various style sheets that may be extracted from a Web page by some embodiments of the disclosed technology, and on which a hash function may be applied by some embodiments of the disclosed technology may, for example, consist of or include one or more files containing a style sheet language such as the Cascading Style Sheets (CSS), and may define some portion of the style and/or presentation of the Web page from which it is extracted.

In some embodiments, the baseline hash value may also include one or more baseline image file hash values, each of which is generated by i) extracting an image file from the Web page displayed by the baseline version of the Web product, and ii) applying the hash function to the image file extracted from the Web page displayed by the baseline version of the Web product. The target hash value may also include one or more target image file hash values, each of which is generated by i) extracting an image file from the Web page displayed by the target version of the Web product, and ii) applying the hash function to the image file extracted from the Web page displayed by the target version of the Web product. Comparing the target hash value to the baseline hash value may also include comparing at least one target image file hash value to at least one baseline image file hash value.

In some embodiments, the baseline hash value may also include one or more baseline font file hash values, each of which is generated by i) extracting a font file from the Web page displayed by the baseline version of the Web product, and ii) applying the hash function to the font file extracted from the Web page displayed by the baseline version of the Web product. The target hash value may also include one or more target font file hash values, each of which is generated by i) extracting a font file from the Web page displayed by the target version of the Web product, and ii) applying the hash function to the font file extracted from the Web page displayed by the target version of the Web product. Comparing the target hash value to the baseline hash value may also include comparing at least one target font file hash value to at least one baseline font file hash value.

Embodiments of the technology described herein may provide significant improvements over previous solutions. For example, embodiments of the disclosed technology may eliminate the need for a user to visually compare screenshots taken of user interfaces for target and baseline versions of a Web product. In addition, in some embodiments, in cases where the hash value comparison shows no difference between the target hash value and the baseline hash value, no automated screenshot comparison needs to be performed beyond the relatively simple hash value comparison, thus eliminating the need to use system resources to perform relatively complex screenshot comparisons when the target hash value and baseline hash value match. Further, performing the hash comparison before performing any automated screenshot comparison reduces or eliminates false negative indications that may otherwise result from external factors (e.g. browser type, screen resolution) if only automatic screenshot comparison is performed in all cases. In some embodiments, performing confirmatory screenshot comparisons in those cases where the target hash value and baseline hash value do not match advantageously avoids false indications of a user interface difference in those cases where the hashes do not match but the user interfaces are in fact the same. In some embodiments, providing a difference notification that graphically indicates the difference between the target screenshot and the baseline screenshot advantageously indicates to the user how the Web page displayed by the target version differs from the Web page displayed by the baseline version, so that the Web page displayed by the target version can be efficiently generated (e.g. modified or not modified as appropriate) so that the user interface of the target version is made to match the user interface of the baseline version.

BRIEF DESCRIPTION OF THE DRAWINGS

The foregoing and other objects, features and advantages will be apparent from the following description of particular embodiments, as illustrated in the accompanying drawings in which like reference characters refer to the same parts throughout the different figures. The elements of the drawings are not necessarily drawn to scale, emphasis instead being placed upon illustrating the principles of the various embodiments.

DETAILED DESCRIPTION

Embodiments will now be described with reference to the figures. Such embodiments are provided only by way of example and for purposes of illustration. The scope of the claims is not limited to the examples of specific embodiments shown in the figures and/or otherwise described herein.

The individual features of the particular embodiments, examples, and implementations described herein can be combined in any manner that makes technological sense. Such features are hereby combined to form all possible combinations, permutations and/or variations except to the extent that such combinations, permutations and/or variations have been expressly excluded herein and/or are technically impractical. Support for all such combinations, permutations and/or variations is considered to exist in this document.

As described herein, in order to detect differences between a user interface of a target version of a Web product and a user interface of a baseline version of the Web product, at least one target hash value is generated for the target version of a Web product from the contents of a Web page that is displayed by the target version of the Web product. The target hash value is compared to a baseline hash value generated from a Web page displayed by a baseline version of the Web product. A difference between the target hash value and the baseline hash value indicates a difference between a user interface of the target version of the Web product and a user interface of the baseline version of the Web product. In response to the comparison of the target hash value to the baseline hash value, the user interface of the target version of the Web product may be generated by modifying the Web page displayed by the target version of the Web product if needed to cause the user interface of the target version of the Web product to match the user interface of the baseline version of the Web product.

Figure 1:
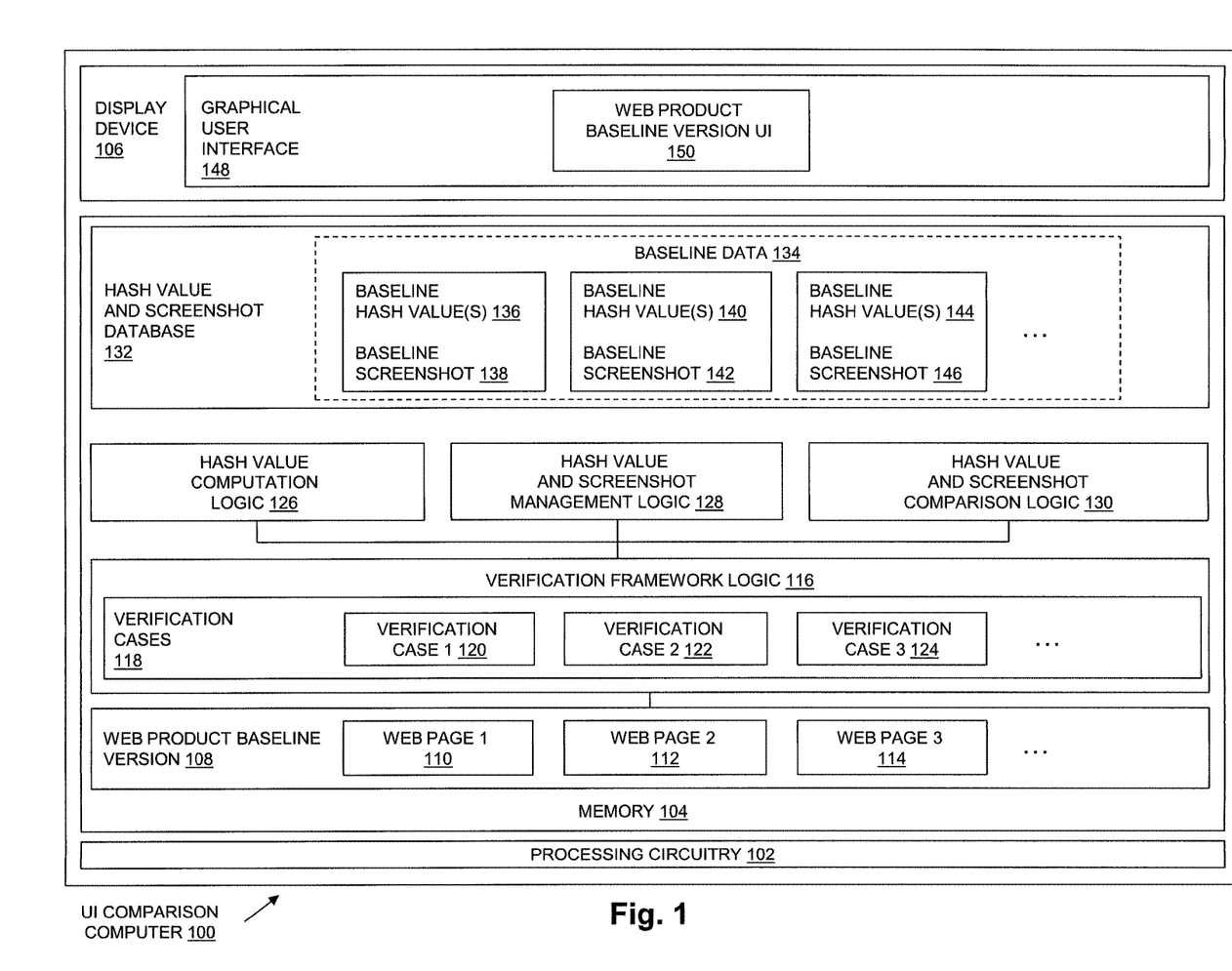
FIG. 1 is a block diagram showing a first example of components in some embodiments of the disclosed technology, showing an example of the generation of one or more baseline hash values and a baseline screenshot for each of one or more verification cases as may be performed in some embodiments.

FIG. 1 is a block diagram showing a first example of components in some embodiments of the disclosed technology, and showing an example of how baseline data may be generated using a baseline version of a Web product in some embodiments. As shown in FIG. 1, a UI (User Interface) Comparison Computer 100 includes Processing Circuitry 102, Memory 104, and a Display Device 106. Processing Circuitry 102 may include or consist of one or more Central Processing Units (CPUs) and associated hardware circuitry, and is operable to execute program code (e.g. instructions) stored in Memory 104.

Display Device 106 may include or consist of any specific type of electronic visual display. A Graphical User Interface 148 may be displayed by Display Device 106.

Memory 104 may include or consist of some combination of Random Access Memory (RAM) and Read Only Memory (ROM).

During operation, the program code stored in Memory 104 is executed on Processing Circuitry 102. Program code components in Memory 104 may include a Framework Logic 116. Verification Framework Logic 116 includes or consists of automated hardware and/or software components that perform a set of functions or actions on a Web product, as shown for purposes of illustration by Verification Cases 118. Verification Cases 118 may include any specific number of verification cases that are designed for verifying the Web product. The Web product that Verification Framework Logic 116 verifies using Verification Cases 118 may include or consist of a Web site, a Web application, or any other type of application software that displays one or more Web pages. For purposes of illustration, Verification Cases 118 are shown including Verification Case 1 120, Verification Case 2 122, Verification Case 3 124, and so on. Each one of the verification cases in Verification Cases 118 defines a verification point in the Web product, sometimes generally referred to as a "checkpoint", at which point the current values of various data objects in the Web product (e.g. the contents of a Web page currently displayed by the Web product, the contents of the user interface displayed by the Web product, etc.) can be accessed and/or verified. When each one of the verification cases is performed by Verification Framework Logic 116, a corresponding set of verification stimuli is applied by the Verification Framework Logic 116 to a version of the Web product. The set of inputs for a verification case may, for example, include a set of automatically generated user inputs, such as automatically generated button clicks and/or other types of automatically generated user inputs. For example, the set of verification stimuli for each verification case may be contained in and/or defined by a script or the like that is run by Verification Framework Logic 116. When each verification case is performed, and the set of verification stimuli for the verification case are applied to a specific version of the Web product, that version of the Web product is caused to display a Web page corresponding to the verification case.

In the example of FIG. 1, in order to generate baseline data (e.g. Baseline Data 134), Verification Cases 118 are performed on a baseline version of the Web product, shown by Web Product Baseline Version 108. Web Product Baseline Version 108 may be a version of the Web product that has previously been verified as correct, e.g. has previously been validated, and is accordingly considered to be a correctly operating version of the Web product. When each one of the verification cases in Verification Cases 118 is performed on Web Product Baseline Version 108, Web Product Baseline Version 108 is caused to display a different baseline Web page in Web Product Baseline Version UI 150. For example, performing Verification Case 1 120 on Web Product Baseline Version 108 causes Web Product Baseline Version 108 to display Web Page 1 110, performing Verification Case 2 122 on Web Product Baseline Version 108 causes Web Product Baseline Version 108 to display Web Page 2 112, performing Verification Case 3 124 on Web Product Baseline Version 108 causes Web Product Baseline Version 108 to display Web Page 3 114, and so on for all the verification cases in Verification Cases 118.

The program code components stored in Memory 104 further include Hash Value Computation Logic 126, Hash Value and Screenshot Management Logic 128, and Hash Value and Screenshot Comparison Logic 130. When each verification case in Verification Cases 118 is performed on Web Product Baseline Version 108, Hash Value Computation Logic 126 generates a corresponding set of baseline data in Baseline Data 134 for the baseline Web page that is displayed by Web Product Baseline Version 108 as a result of that verification case being performed on Web Product Baseline Version 108. Each set of baseline data that is generated by Hash Value Computation Logic 126 is stored into the Hash Value and Screenshot Database 132, e.g. by Hash Value and Screenshot Management Logic 128. For example, when Verification Case 1 120 is performed on Web Product Baseline Version 108 Hash Value Computation Logic 126 generates a set of baseline data for Web Page 1 110 that includes Baseline Hash Value(s) 136 and Baseline Screenshot 138. When Verification Case 2 122 is performed on Web Product Baseline Version 108 Hash Value Computation Logic 126 generates a set of baseline data for Web Page 2 112 that includes Baseline Hash Value(s) 140 and Baseline Screenshot 142. When Verification Case 3 124 is performed on Web Product Baseline Version 108 Hash Value Computation Logic 126 generates a set of baseline data for Web Page 3 114 that includes Baseline Hash Value(s) 144 and Baseline Screenshot 146, and so on for all verification cases in Verification Cases 118.

Each of the baseline hash value(s) generated for a baseline Web page displayed by Web Product Baseline Version 108 may be generated by Hash Value Computation Logic 126 from contents extracted from the baseline Web page. For example, Baseline Hash Value(s) 136 may be generated from contents extracted from Web Page 1 110, Baseline Hash Value(s) 140 may be generated from contents extracted from Web Page 2 112, Baseline Hash Value(s) 144 may be generated from contents extracted from Web Page 3 114, and so on for each one of the baseline Web pages that are caused to be displayed by Web Product Baseline Version 108 when Verification Cases 118 are performed on Web Product Baseline Version 108.

In some embodiments, the baseline hash value(s) generated for each baseline Web page displayed by Web Product Baseline Version 108 may include a baseline HTML hash value that Hash Value Computation Logic 126 generates by i) extracting all of the HyperText Markup Language (HTML) contained in the baseline Web page from the baseline Web page, and then ii) applying a hash function to the HyperText Markup Language (HTML) extracted from the baseline Web page. For example, in some embodiments, Hash Value Computation Logic 126 may extract the HTML contained in a baseline Web page that is caused to be displayed by Web Product Baseline Version 108 using the HTML Document Object Model (DOM) innerHTML property (e.g. document.documentElement.innerHTML).

In some embodiments, the baseline hash value(s) generated for each baseline Web page displayed by Web Product Baseline Version 108 may further include one or more baseline style sheet hash values, each of which Hash Value Computation Logic 126 generates by i) extracting a style sheet contained in the baseline Web page from the baseline Web page, and then ii) applying a hash function to the style sheet extracted from the baseline Web page. For example, in some embodiments Hash Value Computation Logic 126 may extract the style sheets contained in each baseline Web page that is displayed by Web Product Baseline Version 108 by extracting a list of style sheet file names from baseline Web page using the HTML Document Object Model (DOM) styleSheets property (e.g. document.styleSheets).

In some embodiments, the baseline hash value(s) generated for each baseline Web page displayed by Web Product Baseline Version 108 may further include one or more baseline image file hash values, each of which Hash Value Computation Logic 126 generates by i) extracting an image file contained in the baseline Web page from the baseline Web page, and then ii) applying a hash function to the image file extracted from the baseline Web page. For example, in some embodiments Hash Value Computation Logic 126 may extract the image files contained in each baseline Web page that is displayed by Web Product Baseline Version 108 by extracting a list of image file names from the baseline Web page using the HTML Document Object Model (DOM) images property (e.g. document.images).

In some embodiments, the baseline hash value(s) generated for each baseline Web page displayed by Web Product Baseline Version 108 may further include one or more baseline font file hash values, each of which Hash Value Computation Logic 126 generates by i) extracting a font file contained in the baseline Web page from the baseline Web page, and then ii) applying a hash function to the font file extracted from the baseline Web page. For example, in some embodiments Hash Value Computation Logic 126 may extract the font files contained in each baseline Web page that is displayed by Web Product Baseline Version 108 by extracting the font file names contained in the style sheets that are extracted from the baseline Web page.

The hash function applied by Hash Value Computation Logic 126 to the HTML, style sheets, image files, and/or font files extracted from each baseline Web page displayed by Web Product Baseline Version 108 may be embodied in program code executing on Processing Circuitry 102, and/or in other hardware circuitry, by any specific hash function. For example, the hash function application by Hash Value Computation Logic 126 may include or consist of a Secure Hash Algorithm (SHA) published by the National Institute of Standards and Technology (NIST), such as SHA-256, or some other specific hash function.

As Verification Cases 118 are being performed on Web Product Baseline Version 108, each of the baseline Web pages that are caused to be displayed by Web Product Baseline Version 108 (e.g. Web Page 1 110, Web Page 2 112, Web Page 3 114, etc.) may be displayed within Graphical User Interface 148, e.g. in Web Product Baseline Version UI 150. In some embodiments, a screenshot may be captured for each baseline Web page displayed by Web Product Baseline Version 108, e.g. by Hash Value Computation Logic 126 capturing a screenshot of Web Product Baseline Version UI 150. For example, a Baseline Screenshot 138 may be captured of Web Product Baseline Version UI 150 while Web Page 1 110 is being displayed, a Baseline Screenshot 142 may be captured from Web Product Baseline Version UI 150 while Web Page 2 112 is being displayed, a Baseline Screenshot 146 may be captured from Web Product Baseline Version UI 150 while Web Page 3 114 is being displayed, and so on for all the baseline Web pages that are caused to be displayed by Web Product Baseline Version 108 when Verification Cases 118 are performed on Web Product Baseline Version 108.

Figure 2:
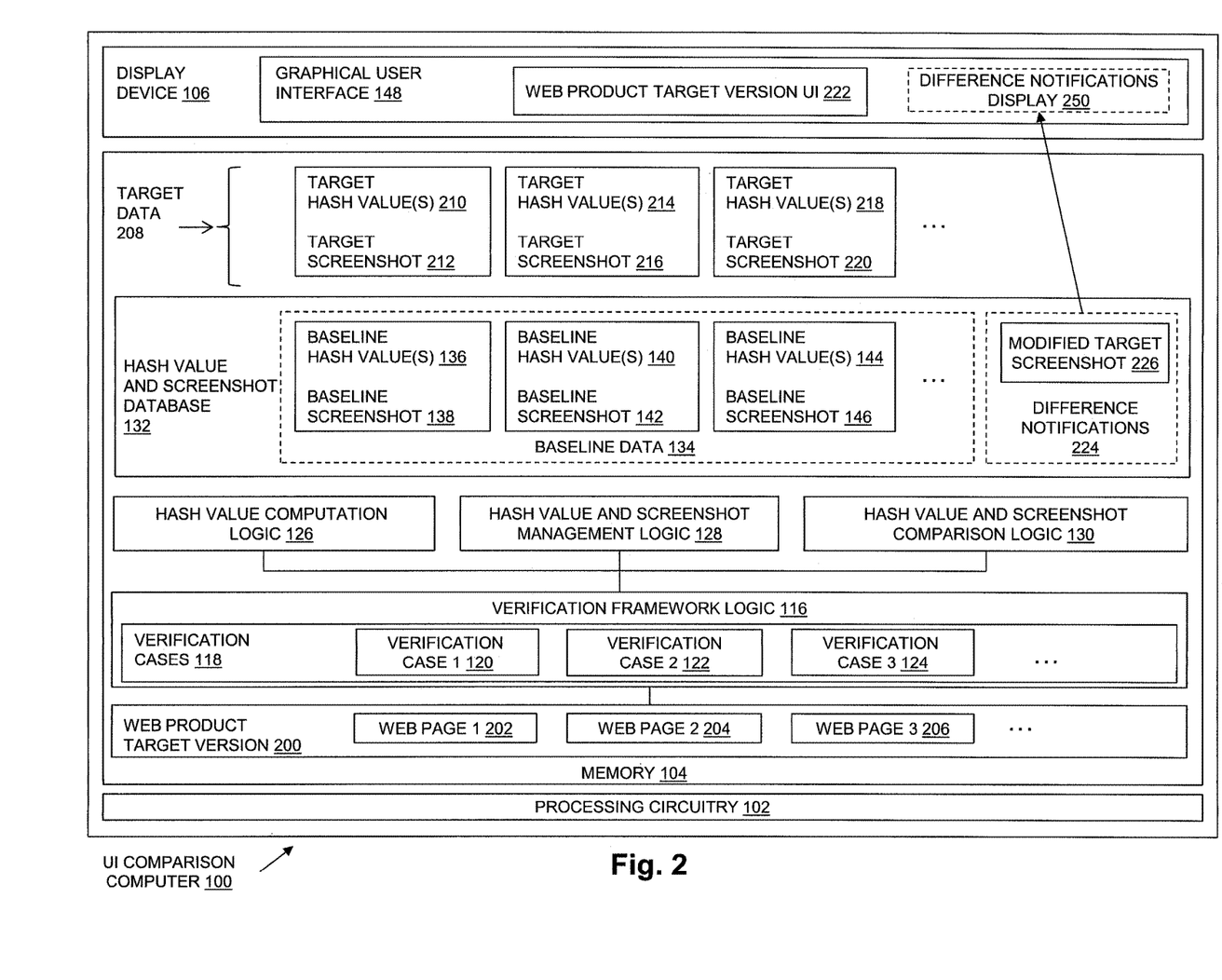
FIG. 2 is a block diagram showing a second example of components in some embodiments of the disclosed technology, showing an example of the comparison of one or more target hash values with one or more corresponding baseline hash values, the comparison of a target screenshot with a corresponding baseline screenshot, and the generation of a difference notification as may be performed for each of one or more verification cases in some embodiments of the disclosed technology.

FIG. 2 is a block diagram showing a second example of components in some embodiments of the disclosed technology, and showing an example of how in some embodiments one or more target hash values generated from a target version of the Web product (e.g. from Web Product Target Version 200) may be compared with one or more corresponding baseline hash values previously generated from the baseline version of the Web product (e.g. from Web Product Baseline Version 108 shown in FIG. 1). FIG. 2 also illustrates how in some embodiments target screenshots generated from the target version of the Web product may be compared with corresponding baseline screenshots generated from the baseline version of the Web product, and also illustrates how in some embodiments a difference notification may be generated for one or more verification cases in some embodiments in response to the comparisons between hash values and/or screenshots.

In the example of FIG. 2, Web Product Target Version 200 is stored in Memory 108, and Verification Framework Logic 116 causes target data to be generated by performing the same verification cases on Web Product Target Version 200 that were previously performed on Web Product Baseline Version 108 to generate baseline data (e.g. FIG. 1). For example, as shown in FIG. 2, Verification Framework Logic 116 performs each of the verification cases in Verification Cases 118 on Web Product Target Version 200. Web Product Target Version 200 may, for example, be a newer and/or updated version of the Web product that may have been developed at least in part by modifying at least a portion of Web Product Baseline Version 108, and/or by augmenting Web Product Baseline Version 108 with new program code. Web Product Target Version 200 may, for example, include new program code that was added to Web Product Baseline Version 108 in order to add new functionality to the Web product that was not present in Web Product Baseline Version 108. Web Product Target Version 200 may also or alternatively include new or modified program code that fixes one or more software bugs that were detected in Web Product Baseline Version 108.

In the example of FIG. 2, when each one of the verification cases in Verification Cases 118 is performed on Web Product Target Version 200, Web Product Target Version 200 is caused to display a different target Web page in Web Product Target Version UI 222. For example, performing Verification Case 1 120 on Web Product Target Version 200 causes Web Product Target Version 200 to display Web Page 1 202, performing Verification Case 2 122 on Web Product Target Version 200 causes Web Product Target Version 200 to display Web Page 2 204, performing Verification Case 3 124 on Web Product Target Version 200 causes Web Product Target Version 200 to display Web Page 3 206, and so on for all the verification cases in Verification Cases 118.

When each verification case in Verification Cases 118 is performed on Web Product Target Version 200, as a result of that verification case being performed on Web Product Target Version 200, Hash Value Computation Logic 126 generates a corresponding set of target data in Target Data 208 for the target Web page that is displayed by Web Product Target Version 200. Each set of target data in Target Data 208 that is generated by Hash Value Computation Logic 126 may be stored into Memory 104, e.g. by Hash Value and Screenshot Management Logic 128. Alternatively, each set of target data in Target Data 208 may be stored by Hash Value and Screenshot Management Logic 128 in Hash Value and Screenshot Database 132. In some embodiments, Hash Value and Screenshot Management Logic 128 may manage hash values and screenshots generated by Hash Value Computation Logic 126 such that target hash value(s) and screenshot generated for a specific verification case are stored in association with that verification case, and such that the baseline hash value(s) and screenshot that were generated for the same verification case are also stored in association with the same verification case.

For example, when Verification Case 1 120 is performed on Web Product Target Version 200, Hash Value Computation Logic 126 generates a set of target data for Web Page 1 202 that includes Target Hash Value(s) 210 and Target Screenshot 212. When Verification Case 2 122 is performed on Web Product Target Version 200, Hash Value Computation Logic 126 generates a set of target data for Web Page 2 204 that includes Target Hash Value(s) 214 and Target Screenshot 216. When Verification Case 3 124 is performed on Web Product Target Version 200, Hash Value Computation Logic 126 generates a set of target data for Web Page 3 206 that includes Target Hash Value(s) 218 and Target Screenshot 220, and so on for all verification cases in Verification Cases 118.

Each of the target hash value(s) generated for a target Web page displayed by Web Product Target Version 200 may be generated by Hash Value Computation Logic 126 from contents extracted from the target Web page. For example, Target Hash Value(s) 210 may be generated from contents extracted from Web Page 1 202, Target Hash Value(s) 214 may be generated from contents extracted from Web Page 2 204, Target Hash Value(s) 218 may be generated from contents extracted from Web Page 3 206, and so on for each one of the target Web pages that are caused to be displayed by Web Product Target Version 200 when Verification Cases 118 are performed on Web Product Target Version 200.

In some embodiments, the target hash value(s) generated for each target Web page displayed by Web Product Baseline Version 108 may include a target HTML hash value that Hash Value Computation Logic 126 generates by i) extracting all of the HyperText Markup Language (HTML) contained in the target Web page from the target Web page, and then ii) applying a hash function to the HyperText Markup Language (HTML) extracted from the target Web page. For example, in some embodiments, Hash Value Computation Logic 126 may extract the HTML contained in a target Web page that is caused to be displayed by Web Product Baseline Version 108 using the HTML Document Object Model (DOM) innerHTML property (e.g. document.documentElement.innerHTML).

In some embodiments, the target hash value(s) generated for each target Web page displayed by Web Product Target Version 200 may further include one or more target style sheet hash values, each of which Hash Value Computation Logic 126 generates by i) extracting a style sheet contained in the target Web page from the target Web page, and then ii) applying a hash function to the style sheet extracted from the target Web page. For example, in some embodiments Hash Value Computation Logic 126 may extract the style sheets contained in each target Web page that is displayed by Web Product Target Version 200 by extracting a list of style sheet file names from the target Web page using the HTML Document Object Model (DOM) styleSheets property (e.g. document.styleSheets).

In some embodiments, the target hash value(s) generated for each target Web page displayed by Web Product Target Version 200 may further include one or more target image file hash values, each of which Hash Value Computation Logic 126 generates by i) extracting an image file contained in the target Web page from the target Web page, and then ii) applying a hash function to the image file extracted from the target Web page. For example, in some embodiments Hash Value Computation Logic 126 may extract the image files contained in each target Web page that is displayed by Web Product Target Version 200 by extracting a list of image file names from the target Web page using the HTML Document Object Model (DOM) images property (e.g. document.images).

In some embodiments, the target hash value(s) generated for each target Web page displayed by Web Product Target Version 200 may further include one or more target font file hash values, each of which Hash Value Computation Logic 126 generates by i) extracting a font file contained in the target Web page from the target Web page, and then ii) applying a hash function to the font file extracted from the target Web page. For example, in some embodiments Hash Value Computation Logic 126 may extract the font files contained in each target Web page that is displayed by Web Product Target Version 200 by extracting the font file names contained in the style sheets that are extracted from the target Web page.

The hash function applied by Hash Value Computation Logic 126 to the HTML, style sheets, image files, and/or font files extracted from each target Web page displayed by Web Product Target Version 200 is the same hash function used by Hash Value Computation Logic 126 to generate the baseline hash values from the baseline Web pages, e.g. a Secure Hash Algorithm (SHA) published by the National Institute of Standards and Technology (NIST), such as SHA-256, or some other specific hash function.

As Verification Cases 118 are being performed on Web Product Target Version 200, each of the target Web pages displayed by Web Product Target Version 200 (e.g. Web Page 1 202, Web Page 2 204, Web Page 3 206, etc.) may be displayed in the Graphical User Interface 148, e.g. in Web Product Target Version UI 222. In some embodiments, each target screenshot captured for a target Web page may accordingly be captured by Hash Value Computation Logic 126 capturing a screenshot of Web Product Target Version UI 150. For example, Target Screenshot 212 may be captured from Web Product Target Version UI 222 while Web Page 1 202 is being displayed, Target Screenshot 216 may be captured from Web Product Target Version UI 222 while Web Page 2 204 is being displayed, Target Screenshot 220 may be captured from Web Product Target Version UI 222 while Web Page 3 206 is being displayed, and so on for all target Web pages displayed by Web Product Target Version 200 when Verification Cases 118 are performed on Web Product Target Version 200.

Further during operation of the components shown in FIG. 2, one or more of the target hash values in Target Data 208 may be compared (e.g. by Hash Value and Screenshot Comparison Logic 130) to one or more corresponding baseline hash values in Baseline Data 134. For example, Hash Value and Screenshot Comparison Logic 130 may compare Target Hash Value(s) 210 to Baseline Hash Value(s) 136, Target Hash Value(s) 214 to Baseline Hash Value(s) 140, Target Hash Value(s) 218 to Baseline Hash Value(s) 144, and so on. A difference between a target hash value and the corresponding baseline hash value indicates a difference between the user interface of the target version of the Web product (e.g. Web Product Target Version UI 222) and the user interface of the baseline version of the Web product (e.g. Web Product Baseline Version UI 150).

The comparison of target hash value(s) to the corresponding baseline hash value(s) may include or consist of comparing a target HTML hash value to a baseline HTML hash value. For example, in the case where Target Hash Value(s) 210 includes a target HTML hash value generated from the HTML contents of Web Page 1 202, and Baseline Hash Value(s) 136 includes a baseline HTML hash value generated from the HTML contents of Web Page 1 110, the comparison of Target Hash Value(s) 210 to Baseline Hash Value(s) 136 may include or consist of a comparison between the target HTML hash value generated from the HTML contents of Web Page 1 202 and the baseline HTML hash value generated from the HTML contents of Web Page 1 110. In the case where Target Hash Value(s) 214 includes a target HTML hash value generated from the HTML contents of Web Page 2 204, and Baseline Hash Value(s) 140 includes a baseline HTML hash value generated from the HTML contents of Web Page 2 112, the comparison of Target Hash Value(s) 214 to Baseline Hash Value(s) 140 may include or consist of a comparison between the target HTML hash value generated from the HTML contents of Web Page 2 204 and the baseline HTML hash value generated from the HTML contents of Web Page 2 112. Similarly, in the case where Target Hash Value(s) 218 includes a target HTML hash value generated from the HTML contents of Web Page 3 206, and Baseline Hash Value(s) 144 includes a baseline HTML hash value generated from the HTML contents of Web Page 3 114, the comparison of Target Hash Value(s) 218 to Baseline Hash Value(s) 144 may include or consist of a comparison between the target HTML hash value generated from the HTML contents of Web Page 3 206 and the baseline HTML hash value generated from the HTML contents of Web Page 3 114, and so on.

In addition to HTML content, each Web page may in some cases additionally contain one or more style sheets, one or more images, and/or one or more font files. Accordingly, in addition to comparing a target HTML hash value to a baseline HTML hash value, the comparison of target hash value(s) to the corresponding baseline hash value(s) may also include i) comparing one or more target style sheet hash values to one or more baseline style sheet hash values, ii) comparing one or more target image file hash values to one or more baseline image file hash values, and/or iii) comparing one or more target font file hash values to one or more baseline font file hash values. For example, the comparison of Target Hash Value(s) 210 to Baseline Hash Value(s) 136 may additionally include comparisons between target style sheet, image file, and/or font file hash values generated from the contents of Web Page 1 202, with baseline style sheet, image file, and/or font file hash values that were previously generated from the contents of Web Page 1 110. The comparison of Target Hash Value(s) 214 to Baseline Hash Value(s) 140 may additionally include comparisons between target style sheet, image file, and/or font file hash values generated from the contents of Web Page 2 204, with baseline style sheet, image file, and/or font file hash values that were previously generated from the contents of Web Page 2 112. Similarly, the comparison of Target Hash Value(s) 218 to Baseline Hash Value(s) 144 may additionally include comparisons between target style sheet, image file, and/or font file hash values generated from the contents of Web Page 3 206, with baseline style sheet, image file, and/or font file hash values that were previously generated from the contents of Web Page 3 114, and so on.

A mismatch between any one or more of the multiple different types of hash values that may be compared during the comparison of target hash value(s) to corresponding baseline hash value(s) indicates a mismatch between the target hash value(s) and the baseline hash value(s). Accordingly, a mismatch is detected when i) a target HTML hash value does not match a corresponding baseline HTML hash value, ii) a target style sheet hash value does not match a corresponding baseline style sheet hash value, iii) a target image file hash value does not match a corresponding baseline image file hash value, or iv) a target font file hash value does not match a corresponding baseline font file hash value.

Comparison of the target hash value(s) generated from a target Web page to the baseline hash value(s) generated from the corresponding baseline Web page may in some cases cause the Web Product Target Version UI 150 to be generated at least in part by modification of the target Web page as may be needed to cause Web Product Target Version UI 222 to match Web Product Baseline Version UI 150. For example, in some cases, detection by Hash Value and Screenshot Comparison Logic 130 of a mismatch between the target hash value(s) generated from the contents of a target Web page and the baseline hash value(s) generated from the contents of the corresponding baseline Web page, when subsequently investigated by a user (e.g. in response to an automatically generated difference notification), may lead to a determination (e.g. by the user) that the target Web page displayed by the Web Product Target Version 200 contains a user interface bug (e.g. an unintended truncation of a display object or value, an unintended overlap of a display element by another display element, or some other type of user interface bug). In such cases, the target Web page can then be modified to remove the bug (e.g. by a developer user modifying the contents of the target Web page to remove the bug), so that when a resulting modified version of the target Web page is later displayed, the Web Product Target Version UI 222 correctly matches the appearance of Web Product Baseline Version UI 150 when the corresponding baseline Web page is displayed. Alternatively, in other cases, detection of a mismatch between the target hash value(s) generated from the contents of a target Web page and the baseline hash value(s) generated from the contents of the corresponding baseline Web page may not indicate the presence of a user interface bug in the target Web page, and may instead either i) not correspond to an actual difference between the target Web product user interface and the baseline Web product user interface, or ii) lead to a determination (e.g. by a user in response to an automatically generated difference notification) that while the target Web product user interface differs from the baseline Web product user interface, the target Web page is correctly designed and the differences between the target Web product user interface and the baseline Web product user interface reflect updates made to the Web product in Web Product Target Version 200. In such cases, the target Web page does not need to be modified, and instead the corresponding baseline hash value(s) may be replaced in Hash Value and Screenshot Database 132 with the target hash value(s).

In some embodiments, detection by Hash Value and Screenshot Comparison Logic 130 of a mismatch between the target hash value(s) generated from the contents of a target Web page and the baseline hash value(s) generated from the contents of the corresponding baseline Web page causes Hash Value and Screenshot Comparison Logic 130 to perform a comparison between the target screenshot generated from the target Web page and the baseline screenshot generated from the corresponding baseline Web page. For example, detection of a mismatch between Target Hash Value(s) 210 and Baseline Hash Value(s) 136 may cause a comparison to be performed between Target Screenshot 212 and Baseline Screenshot 138, detection of a mismatch between Target Hash Value(s) 214 and Baseline Hash Value(s) 140 may cause a comparison to be performed between Target Screenshot 216 and Baseline Screenshot 142, detection of a mismatch between Target Hash Value(s) 218 and Baseline Hash Value(s) 144 may cause a comparison to be performed between Target Screenshot 220 and Baseline Screenshot 146, and so on.

In some embodiments, detection by Hash Value and Screenshot Comparison Logic 130 of a mismatch between a target screenshot generated from a target Web page and the baseline screenshot generated from the corresponding baseline Web page causes Hash Value and Screenshot Comparison Logic 130 to generate a difference notification indicating that Web Product Target Version UI 222 does not match Web Product Baseline Version UI 150. For example, in response to detecting a mismatch between Target Screenshot 212 and Baseline Screenshot 138, Hash Value and Screenshot Comparison Logic 130 may generate a difference notification indicating that when Web Page 1 202 is displayed, Web Product Target Version UI 222 does not match Web Product Baseline Version UI 150 at the time when Web Page 1 110 was displayed. The difference notification generated by Hash Value and Screenshot Comparison Logic 130 may include a graphical indication that visually indicates the difference between the target screenshot and the baseline screenshot. Generating such a graphical indication of the difference between the target screenshot and the baseline screenshot may include identifying and highlighting the pixels in the target screenshot that differ from the corresponding pixels in the baseline screenshot, and then storing the result as a modified version of the target screenshot that serves as the difference notification, and that may later be displayed (e.g. to the user).

For example, generating a difference notification in response to detecting a difference between Target Screenshot 212 and Baseline Screenshot 138 may include i) identifying a region of pixels within Target Screenshot 212 that is different from a corresponding region of pixels within Baseline Screenshot 138, ii) generating Modified Target Screenshot 226 as a modified version of Target Screenshot 212 that visually indicates the region of pixels within Target Screenshot 212 that is different from the corresponding region of pixels within Baseline Screenshot 138, and iii) storing Modified Target Screenshot 226 into a repository of one or more difference notifications that are generated while Verification Cases 118 are performed on Web Product Target Version 200, e.g. storing Modified Target Screenshot 226 into Difference Notifications 224. Difference Notifications 224 may, for example, consist of or include one or more databases, or alternatively may be contained within Hash Value and Screenshot Database 132. For example, Modified Screenshot 226 may be one of multiple difference notifications that are generated in response to detecting differences between target screenshots and corresponding baseline screenshots and then stored in Difference Notifications 224 while Verification Cases 118 are being performed on Web Product Target Version 200. Modified Screenshot 226 and any other difference notifications stored in Difference Notifications 224 may then subsequently be displayed to the user, e.g. in Difference Notifications Display 250 within the Graphical User Interface 148. For example, Modified Screenshot 226 and any other difference notifications stored in Difference Notifications 224 may be image files or the like, and may be displayed after all the verification cases in Verification Cases 118 have been performed on Web Product Target Version 200. Modified Screenshot 226 and any other difference notifications stored in Difference Notifications 224 may be displayed in Difference Notifications Display 250 by Hash Value and Screenshot Management Logic 128, Hash Value and Screenshot Comparison Logic 130, and/or some other display program executing in UI Comparison Computer 100 that is operable to display image files.

Figure 3:
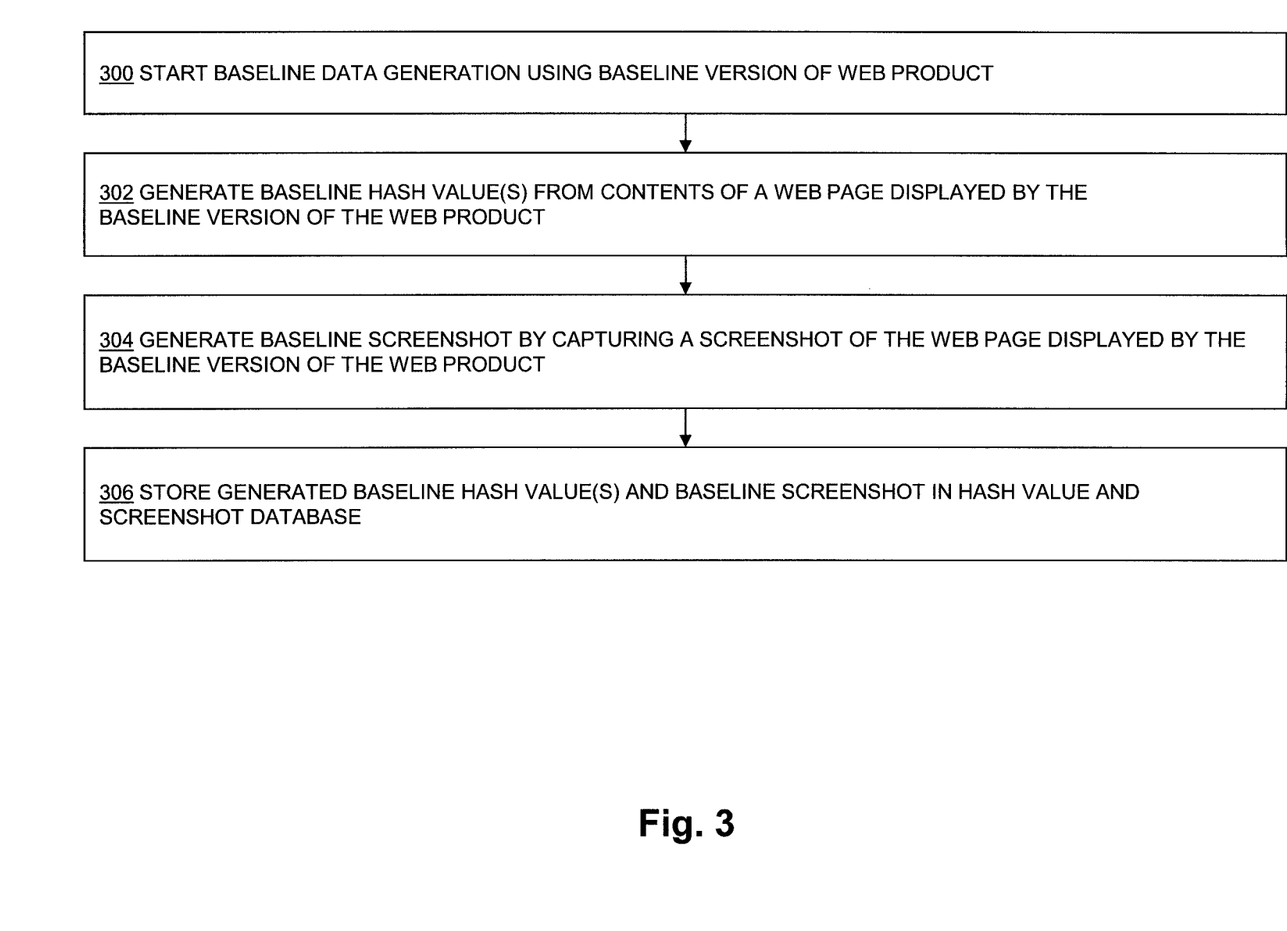
FIG. 3 is a flow chart showing an example of steps that may be performed to generate baseline data in some embodiments of the disclosed technology.

FIG. 3 is a flow chart showing an example of steps that may be performed to generate a set of baseline data for a baseline Web page in some embodiments of the disclosed technology. At step 300 baseline data generation is started using a baseline version of a Web product. The baseline version of the Web product may be a previously verified version of the Web product.

At step 302, one or more baseline hash values are generated by applying a hash function to the contents of a baseline Web page that is displayed by the baseline version of the Web product in a user interface of the baseline version of the Web product. The baseline hash value(s) may include a baseline HTML hash value generated from the HTML contents of the baseline Web page. In some cases, the baseline hash value(s) may further include one or more baseline style sheet hash values, one or more baseline image file hash values, and/or one or more baseline font file hash values that may also be generated from the contents of the baseline Web page.

At step 304, a baseline screenshot is generated by capturing the contents of a user interface of the baseline version of the Web product while the baseline Web page is being displayed in the user interface of the baseline version of the Web product.

At step 306, the baseline hash value(s) and baseline screenshot are stored into a database (e.g. a hash value and screenshot database) for later access.

Figure 4:
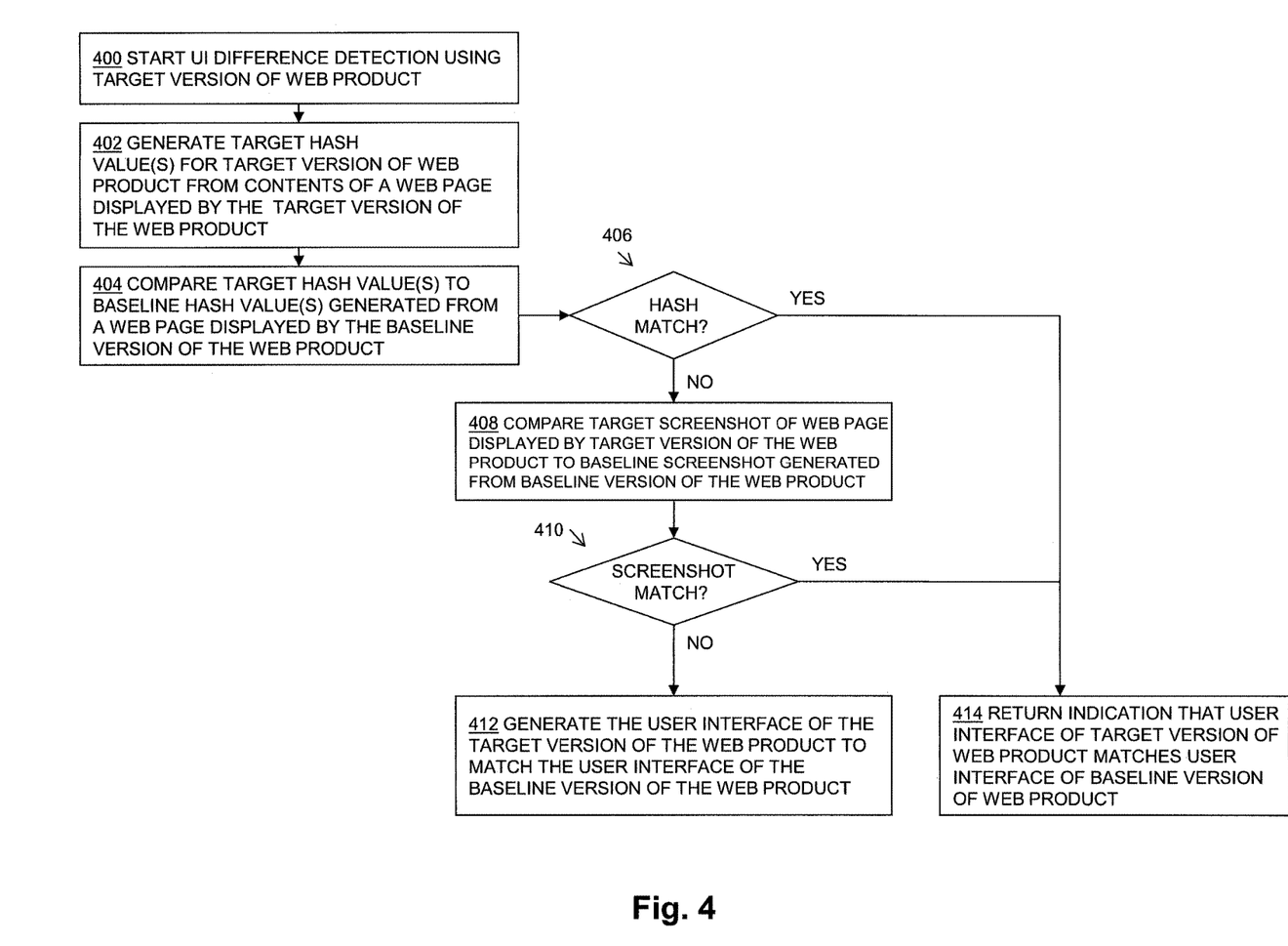
FIG. 4 is a flow chart illustrating steps performed during operation of some embodiments of the disclosed technology to perform user interface difference detection using the baseline data generated in FIG. 3.

FIG. 4 is a flow chart illustrating steps performed during operation of some embodiments of the disclosed technology to perform user interface difference detection using the baseline data generated in FIG. 3. At step 400 user interface difference detection is started using a target version of the Web product. The target version of the Web product may, for example, be an updated version of the Web product relative to the baseline version of the Web product that was used to generate the baseline data in the steps of FIG. 3, and may include some number of bug fixes and/or additional functionality relative to the baseline version of the Web product.

At step 402, one or more target hash values are generated by applying a hash function to the contents of a target Web page that is displayed by the target version of the Web product in a user interface of the target version Web product. The target hash value(s) may include a target HTML hash value generated from the HTML contents of the target Web page. In some cases, the target hash value(s) may further include one or more target style sheet hash values, one or more target image file hash values, and/or one or more target font file hash values that may also be generated from the contents of the target Web page.

At step 404, the target hash value(s) generated in step 402 are compared to the baseline hash value(s) previously generated from the baseline Web page displayed by the baseline version of the Web product.

At step 406, a branching operation is performed based on whether the target hash value(s) match the baseline hash value(s). In the event that all the target hash value(s) match the baseline hash value(s), step 406 is followed by step 414, in which a notification is returned indicating that the user interface of the target version of the Web product matches the user interface of the baseline version of the Web product.

Otherwise, in the event that one or more of the target hash value(s) does not match the baseline hash value(s), step 406 is followed by step 408, in which a target screenshot generated by capturing the contents of the user interface of the of the target version of the Web product while the target Web page is being displayed to the baseline screenshot previously generated in step 304 of FIG. 3.

At step 410, a branching operation is performed based on whether the target screenshot matches the baseline screenshot. In the event that the target screenshot matches the baseline screenshot, step 410 is followed by step 414, in which a notification is returned indicating that the user interface of the target version of the Web product matches the user interface of the baseline version of the Web product.

Otherwise, in the event that the target screenshot does not match the baseline screenshot, step 410 is followed by step 412, in which the user interface of the target version of the Web product is generated by modifying the Web page displayed by the target version of the Web product to cause the user interface of the target version of the Web product to match the user interface of the baseline version of the Web product. For example, in some embodiments, step 412 may include generating a difference notification that indicates that the user interface of the target version of the Web product does not match the user interface of the baseline version of Web product, and then subsequently displaying the difference notification in a difference notifications display provided within a graphical user interface. A user may then be caused by display of the different notification to modify the Web page displayed by the target version of the Web product to cause the user interface of the target version of the Web product to match the user interface of the baseline of the Web product.

Figure 5:
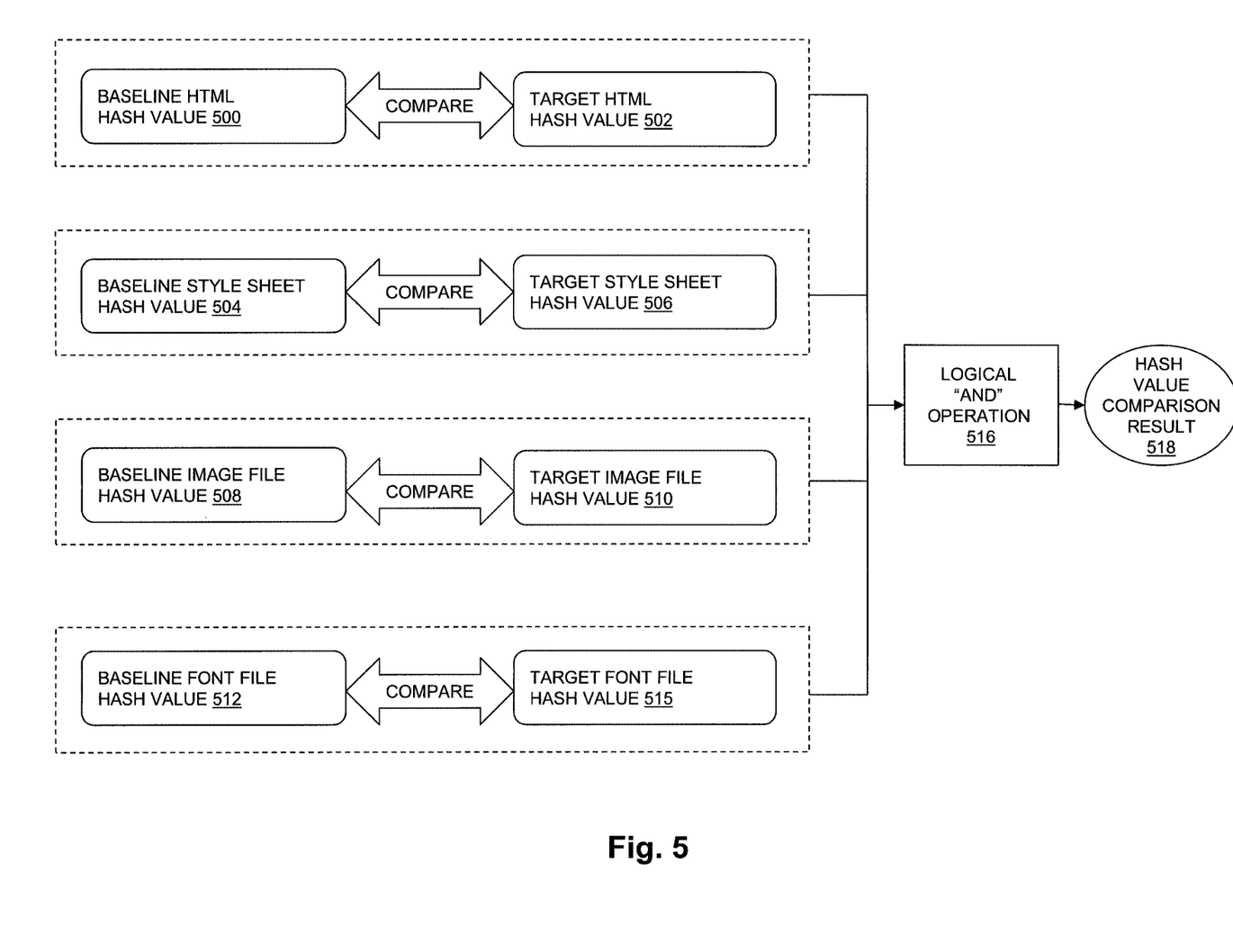
FIG. 5 is a flow chart illustrating steps performed during operation of some embodiments of the disclosed technology to compare one or more target hash values with one or more corresponding baseline hash values in order to detect whether the target hash values match the baseline hash values.

FIG. 5 is a flow chart illustrating steps performed during operation of some embodiments of the disclosed technology to compare one or more target hash values with one or more corresponding baseline hash values in order to detect whether the target hash values generated for a corresponding verification case match the baseline hash values generated for the same verification case. In the example of FIG. 5, the baseline hash values include a Baseline HTML Hash Value 500, a Baseline Style Sheet Hash Value 504, a Baseline Image File Hash Value 508, and a Baseline Font File Hash Value 512, and the target hash values include a Target HTML Hash Value 502, a Target Style Sheet Hash Value 506, a Target Image File Hash Value 510, and a Target Font File Hash Value 515. However, the technology described herein is not limited to the specific baseline and target hash values shown in FIG. 5, and those skilled in the art will recognize that while generally a baseline Web page will contain HTML from which Baseline HTML Hash Value 500 is generated, and a target Web page will contain HTML from which Target HTML Hash Value 502 is generated, Web pages may in general include zero or more style sheets, image files, and/or font files. Accordingly, while for purposes of explanation the example of FIG. 5 shows, in addition to a single baseline HTML hash value and a single target HTML hash value, individual baseline style sheet, image file, and font file hash values, and individual target style sheet, image file, and font file hash values, in other cases there may be zero or more baseline style sheet, image file, and/or font file hash values, and zero or more target style sheet, image file, and/or font file hash values.

As shown in FIG. 5, Baseline HTML Hash Value 500 is compared to Target HTML Hash Value 502, Baseline Style Sheet Hash Value 504 is compared to Target Style Sheet Hash Value 506, Baseline Image File Hash Value 508 is compared to Target Image File Hash Value 510, and Baseline Font File Hash Value 512 is compared to Target Font File Hash Value 515. The result of each comparison is TRUE if there is a match, and FALSE if there is not a match. The comparison results are all passed to a Logical "AND" Operation 516. The result of the Logical "AND" Operation 516 is TRUE if all of all of the comparisons have a result of TRUE (all the hash values match), and FALSE if any one or more of the comparisons had a FALSE result (one or more of the hash values do not match). The result of Logical "AND" Operation 516 is shown by Hash Value Comparison Result 518, which will accordingly have a value of TRUE in the case where all of the hash values match, and a value of FALSE if one or more of the hash values do not match. In some embodiments Logical "AND" Operation 516 may, for example, consist of or include program code stored in the Memory 104 shown in FIG. 1 and FIG. 2, that executes on the Processing Circuitry 102 shown in FIG. 1 and FIG. 2.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

Aspects of the technologies disclosed herein may be embodied as a system, method or computer program product. Accordingly, elements described herein may be embodied using hardware, software (including firmware, resident software, micro-code, etc.) or a combination of software and hardware. Furthermore, functions of the embodiments illustrated herein may take the form of a computer program product embodied at least in part in one or more non-transitory computer readable storage medium(s) having computer readable program code stored thereon for causing one or more processors to carry out those functions.

Any combination of one or more non-transitory computer readable storage medium(s) may be utilized. Examples of a non-transitory computer readable storage medium include, but are not limited to, an optical disc (e.g. CD or DVD), an optical storage device, a magnetic disk, a magnetic storage device, a random access memory (RAM), a read-only memory (ROM), an erasable programmable read-only memory (EPROM or Flash memory), and/or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments. It will be understood that one or more of the block in such figures, and combinations of the blocks, can be implemented by computer program instructions. These computer program instructions may be executed on processing circuitry to form specialized hardware. The computer program instructions may further be loaded onto a computing device to produce a machine, such that the instructions which execute on the computing device create means for implementing the functions specified in the block or blocks. The computer program instructions may also be stored in a computer-readable memory that can direct a computing device to function in a particular manner, such that the instructions stored in the computer-readable memory produce an article of manufacture including instruction means which implement the function specified in the block or blocks. The computer program instructions may also be loaded onto a computing device to cause a series of operational steps to be performed to produce a computer implemented process such that the instructions which execute on the computing device provide steps for implementing the functions specified in the block or blocks.

It will also be understood by those of ordinary skill in the art that modification to and variation of the illustrated embodiments may be made without departing from the inventive concepts described herein.

What is claimed is:

1. A method of generating a user interface of a Web product, comprising:
    generating at least one target hash value for a target version of the Web product from contents of a Web page displayed by the target version of the Web product at least in part by i) extracting HyperText Markup Language (HTML) contained in the Web page displayed by the target version of the Web product, wherein the extracting is performed using the HTML Document Object Model (DOM), and ii) applying a hash function to the HTML extracted from the Web page displayed by the target version of the Web product;
    comparing the target hash value to a baseline hash value generated from a Web page displayed by a baseline version of the Web product, wherein a difference between the target hash value and the baseline hash value indicates a difference between a user interface of the target version of the Web product and a user interface of the baseline version of the Web product; and
    in response to the comparison of the target hash value to the baseline hash value being indicative of a mismatch between the hash values,
        performing a comparison of screenshots of the different versions of the Web page to identify false positive indications from the comparison of the hash values, and
        generating the user interface of the target version of the Web product by modifying the Web page displayed by the target version of the Web product to cause the user interface of the target version of the Web product to match the user interface of the baseline version of the Web product.

2. The method of claim 1, further comprising:
    generating a target screenshot of the Web page displayed by the target version of the Web product; and
    wherein performing the comparison of screen shots comprises, in response to detecting a difference between the target hash value and the baseline hash value,
        comparing the target screenshot of the Web page displayed by the target version of the Web product to a baseline screenshot generated from the baseline version of the Web product; and
        in response to detecting a difference between the target screenshot and the baseline screenshot, generating a difference notification indicating that the user interface of the target version of the Web product does not match a user interface of the baseline version of the Web product, wherein the difference notification includes a graphical indication of the difference between the target screenshot and the baseline screenshot.

3. The method of claim 2, wherein generating the difference notification includes:
    identifying a region of pixels within the target screenshot that is different from a corresponding region of pixels within the baseline screenshot;
    generating a modified target screenshot at least in part based on modification of the target screenshot to visually indicate the region of pixels within the target screenshot that is different from the corresponding region of pixels within the baseline screenshot; and
    storing the modified target screenshot into a screenshot repository that stores one or more modified target screenshots.

4. The method of claim 3, further comprising displaying one or more of the modified target screenshots in a user interface, including the modified screenshot that visually indicates the region of pixels within the target screenshot that is different from the corresponding region of pixels within the baseline screenshot.

5. The method of claim 4, further comprising generating baseline data from the baseline version of the Web product at least in part by:

generating the at least one baseline hash value from contents of a Web page displayed by the baseline version of the Web product; and capturing the baseline screenshot by capturing a screenshot of the Web page displayed by the baseline version of the Web product.

6. The method of claim 5, wherein the at least one baseline hash value comprises a baseline HTML hash value generated by i) extracting HyperText Markup Language (HTML) from the Web page displayed by the baseline version of the Web product and ii) applying a hash function to the HyperText Markup Language (HTML) extracted from the Web page displayed by the baseline version of the Web product; and wherein comparing the target hash value to the baseline hash value comprises comparing the target HTML hash value to the baseline HTML hash value.

7. The method of claim 6, wherein the at least one baseline hash value further comprises a baseline style sheet hash value generated by i) extracting at least one style sheet from the Web page displayed by the baseline version of the Web product, and ii) applying the hash function to the style sheet extracted from the Web page displayed by the baseline version of the Web product;

wherein the at least one target hash value further comprises a target style sheet hash value generated by i) extracting at least one style sheet from the Web page displayed by the target version of the Web product, and ii) applying the hash function to the style sheet extracted from the Web page displayed by the target version of the Web product; and wherein comparing the target hash value to the baseline hash value further comprises also comparing the target style sheet hash value to the baseline style sheet hash value.

8. The method of claim 7, wherein the at least one baseline hash value further comprises a baseline image file hash value generated by i) extracting at least one image file from the Web page displayed by the baseline version of the Web product, and ii) applying the hash function to the image file extracted from the Web page displayed by the baseline version of the Web product;

wherein the at least one target hash value further comprises a target image file hash value generated by i) extracting at least one image file from the Web page displayed by the target version of the Web product, and ii) applying the hash function to the image file extracted from the Web page displayed by the target version of the Web product; and wherein comparing the target hash value to the baseline hash value further comprises also comparing the target image file hash value to the baseline image file hash value.

9. The method of claim 8, wherein the at least one baseline hash value further comprises a baseline font file hash value generated by i) extracting at least one font file from the Web page displayed by the baseline version of the Web product, and ii) applying the hash function to the font file extracted from the Web page displayed by the baseline version of the Web product;

wherein the at least one target hash value further comprises a target font file hash value generated by i) extracting at least one font file from the Web page displayed by the target version of the Web product, and ii) applying the hash function to the font file extracted from the Web page displayed by the target version of the Web product; and wherein comparing the target hash value to the baseline hash value further comprises also comparing the target font file hash value to the baseline font file hash value.

10. A system for generating a user interface of a Web product, comprising:

processing circuitry;

a memory storing program code executable on the processing circuitry, and wherein the program code, when executed by the processing circuitry, causes the processing circuitry to:

generate at least one target hash value for a target version of the Web product from contents of a Web page displayed by the target version of the Web product at least in part by i) extracting HyperText Markup Language (HTML) contained in the Web page displayed by the target version of the Web product, wherein the extracting is performed using the HTML Document Object Model (DOM), and ii) applying a hash function to the HTML extracted from the Web page displayed by the target version of the Web product, compare the target hash value to a baseline hash value generated from a Web page displayed by a baseline version of the Web product, wherein a difference between the target hash value and the baseline hash value indicates a difference between a user interface of the target version of the Web product and a user interface of the baseline version of the Web product, and in response to the comparison of the target hash value to the baseline hash value being indicative of a mismatch between the hash values, perform a comparison of screenshots of the different versions of the Web page to identify false positive indications from the comparison of the hash values, and generate the user interface of the target version of the Web product by modifying the Web page displayed by the target version of the Web product to cause the user interface of the target version of the Web product to match the user interface of the baseline version of the Web product.

11. The system of claim 10, wherein the program code, when executed by the processing circuitry, further causes the processing circuitry to:

generate a target screenshot of the Web page displayed by the target version of the Web product; and wherein performance of the comparison of screen shots comprises, in response to detection of a difference between the target hash value and the baseline hash value, comparison of the target screenshot of the Web page displayed by the target version of the Web product to a baseline screenshot generated from the baseline version of the Web product; and in response to detection of the difference between the target screenshot and the baseline screenshot, generate a difference notification indicating that the user interface of the target version of the Web product does not match a user interface of the baseline version of the Web product, wherein the difference notification includes a graphical indication of the difference between the target screenshot and the baseline screenshot.

12. The system of claim 11, wherein the program code, when executed by the processing circuitry, further causes the processing circuitry to generate the difference notification by causing the processing circuitry to:
  identify a region of pixels within the target screenshot that is different from a corresponding region of pixels within the baseline screenshot;
  generate a modified target screenshot at least in part based on modification of the target screenshot to visually indicate the region of pixels within the target screenshot that is different from the corresponding region of pixels within the baseline screenshot; and
  store the modified target screenshot into a screenshot repository that stores one or more modified target screenshots.

13. The system of claim 12, wherein the program code, when executed by the processing circuitry, further causes the processing circuitry to display one or more of the modified target screenshots, including the modified screenshot that visually indicates the region of pixels within the target screenshot that is different from the corresponding region of pixels within the baseline screenshot.

14. The system of claim 13, wherein the program code, when executed by the processing circuitry, causes the processing circuitry to generate baseline data from the baseline version of the Web product by causing the processing circuitry to:
  generate the at least one baseline hash value from contents of a Web page displayed by the baseline version of the Web product; and
  capture the baseline screenshot by capturing a screenshot of the Web page displayed by the baseline version of the Web product.

15. The system of claim 14, wherein the program code, when executed by the processing circuitry, further causes the processing circuitry to generate at least one baseline hash value by causing the processing circuitry to generate a baseline HTML hash value by i) extracting HyperText Markup Language (HTML) from the Web page displayed by the baseline version of the Web product and ii) applying a hash function to the HyperText Markup Language (HTML) extracted from the Web page displayed by the baseline version of the Web product;
  and
  wherein the program code, when executed by the processing circuitry, further causes the processing circuitry to compare the target hash value to the baseline hash value by causing the processing circuitry to compare the target HTML hash value to the baseline HTML hash value.

16. The system of claim 15, wherein the program code, when executed by the processing circuitry, further causes the processing circuitry to generate at least one baseline hash value by causing the processing circuitry to generate a baseline style sheet hash value by i) extracting at least one style sheet from the Web page displayed by the baseline version of the Web product, and ii) applying the hash function to the style sheet extracted from the Web page displayed by the baseline version of the Web product;
  wherein the program code, when executed by the processing circuitry, further causes the processing circuitry to generate at least one target hash value by causing the processing circuitry to generate a target style sheet hash value by i) extracting at least one style sheet from the Web page displayed by the target version of the Web product, and ii) applying the hash function to the style sheet extracted from the Web page displayed by the target version of the Web product; and
  wherein the program code, when executed by the processing circuitry, further causes the processing circuitry to compare the target hash value to the baseline hash value by also comparing the target style sheet hash value to the baseline style sheet hash value.

17. The system of claim 16, wherein the program code, when executed by the processing circuitry, further causes the processing circuitry to generate the at least one baseline hash value by causing the processing circuitry to generate a baseline image file hash value by i) extracting at least one image file from the Web page displayed by the baseline version of the Web product, and ii) applying the hash function to the image file extracted from the Web page displayed by the baseline version of the Web product;
  wherein the program code, when executed by the processing circuitry, further causes the processing circuitry to generate the at least one target hash value by causing the processing circuitry to generate a target image file hash value by i) extracting at least one image file from the Web page displayed by the target version of the Web product, and ii) applying the hash function to the image file extracted from the Web page displayed by the target version of the Web product; and
  wherein the program code, when executed by the processing circuitry, further causes the processing circuitry to compare the target hash value to the baseline hash value further by also comparing the target image file hash value to the baseline image file hash value.

18. The system of claim 17, wherein the program code, when executed by the processing circuitry, further causes the processing circuitry to generate at least one baseline hash value by causing the processing circuitry to generate a baseline font file hash value by i) extracting at least one font file from the Web page displayed by the baseline version of the Web product, and ii) applying the hash function to the font file extracted from the Web page displayed by the baseline version of the Web product;
  wherein the program code, when executed by the processing circuitry, further causes the processing circuitry to generate at least one target hash value by causing the processing circuitry to generate a target font file hash value by i) extracting at least one font file from the Web page displayed by the target version of the Web product, and ii) applying the hash function to the font file extracted from the Web page displayed by the target version of the Web product; and
  wherein the program code, when executed by the processing circuitry, further causes the processing circuitry to compare the target hash value to the baseline hash value by also comparing the target font file hash value to the baseline font file hash value.

19. A non-transitory computer readable medium storing program code for generating a user interface of a Web product, wherein the program code, when executed by processing circuitry, causes the processing circuitry to perform a method of:
  generating at least one target hash value for a target version of the Web product from contents of a Web page displayed by the target version of the Web product at least in part by i) extracting HyperText Markup Language (HTML) contained in the Web page displayed by the target version of the Web product, wherein the extracting is performed using the HTML Document Object Model (DOM), and ii) applying a hash function to the HTML extracted from the Web page displayed by the target version of the Web product;

comparing the target hash value to a baseline hash value generated from a Web page displayed by a baseline version of the Web product, wherein a difference between the target hash value and the baseline hash value indicates a difference between a user interface of the target version of the Web product and a user interface of the baseline version of the Web product; and in response to the comparison of the target hash value to the baseline hash value being indicative of a mismatch between the hash values, performing a comparison of screenshots of the different versions of the Web page to identify false positive indications from the comparison of the hash values, and generating the user interface of the target version of the Web product by modifying the Web page displayed by the target version of the Web product to cause the user interface of the target version of the Web product to match the user interface of the baseline version of the Web product.

20. The non-transitory computer readable medium of claim 19, wherein the method caused to be performed by the processing circuitry further comprises:

generating a target screenshot of the Web page displayed by the target version of the Web product;

wherein performing the comparison of screen shots comprises, in response to detecting a difference between the target hash value and the baseline hash value, comparing the target screenshot of the Web page displayed by the target version of the Web product to a baseline screenshot generated from the baseline version of the Web product; and in response to detecting a difference between the target screenshot and the baseline screenshot, generating a difference notification indicating that the user interface of the target version of the Web product does not match a user interface of the baseline version of the Web product, wherein the difference notification includes a graphical indication of the difference between the target screenshot and the baseline screenshot.

* * * * *